United States Patent

Bisaiji et al.

Patent Number: 5,410,339
Date of Patent: Apr. 25, 1995

[54] IMAGE FORMING APPARATUS

[75] Inventors: Takashi Bisaiji; Yuji Sawai, both of Yokohama, Japan

[73] Assignee: Ricoh Company, Ltd., Tokyo, Japan

[21] Appl. No.: 50,617

[22] Filed: Apr. 22, 1993

[30] Foreign Application Priority Data

Apr. 22, 1992 [JP] Japan .................. 4-130097
Jan. 27, 1993 [JP] Japan .................. 5-031459

[51] Int. Cl.⁶ .................................. H04N 1/21
[52] U.S. Cl. ...................... 347/140; 347/155
[58] Field of Search ............... 346/1.1, 107 R, 76 L, 346/108, 160; 355/246, 214, 208

[56] References Cited

U.S. PATENT DOCUMENTS

5,061,949 10/1991 Ogino et al. .................. 346/160
5,355,200 10/1994 Ohba et al. .................. 355/246

Primary Examiner—Mark J. Reinhart
Attorney, Agent, or Firm—Oblon, Spivak, McClelland, Maier & Neustadt

[57] ABSTRACT

An image forming apparatus which feeds a predetermined bias current smaller than a threshold current to a semiconductor included in digital optics at least during image formation so as to enhance response. During image formation, the apparatus maintains the bias current at an adequate value.

9 Claims, 9 Drawing Sheets

IMAGE FORMING APPARATUS

BACKGROUND OF THE INVENTION

The present invention relates to a copier, facsimile apparatus, printer or similar image forming apparatus having digital optics for forming a latent image on an image carrier and, more particularly, to an image forming apparatus of the type feeding a bias current smaller than a predetermined value to a light source included in digital optics even when image formation is not under way.

An image forming apparatus of the type uniformly charging a photoconductive element or similar image carrier and then scanning it with digital optics including a light source in response to image data is conventional. The light source is implemented as a laser or similar light emitting diode (LED). Generally, image data are written on the image carrier in high dot density and in dots each having multiple levels in order to attain high resolution and high tonality at the same time. To provide a dot with multiple levels, the laser is usually modulated by power modulation (PM) or pulse width modulation (PWM) which respectively control the intensity and the duration of light to issue from the laser. While an image forming apparatus of the type having digital optics has customarily been implemented as a terminal associated with a computer, it is increasingly applied even to ordinary copiers due to the recent remarkable cost reduction of semiconductor parts. Regarding a computer, it is not necessary for this type of apparatus to operate at high process speed. However, when it comes to an ordinary copier, the apparatus is required to implement high productivity and, therefore, high process speed, resulting in an increase in the frequency for modulating the laser.

Generally, to provide a laser beam with particular intensity, a particular drive current has to be fed to the laser, as understood from the relation between the drive current applied to the laser and the emission intensity. However, when the modulation frequency for modulating the laser 1 is increased, a drive current circuit and the laser itself cannot follow the modulation frequency due to responses particular thereto. This problem is especially serious with PWM which controls the duration of emission of the laser, as stated above. When the emission intensity of the laser is short of required one, the quantity of light to incident on a photoconductive element becomes short. As a result, the image density decreases in a negative-to-positive type image forming apparatus which deposits a toner in the exposed portions of a photoconductive element, or the background is contaminated in a positive-to-negative type apparatus which deposits a toner in unexposed portions.

To eliminate this problem, it has been proposed to constantly apply a particular bias current to the laser, so that the laser drive current may rise to a drive value from the value of the bias current instead of from zero, as disclosed in Japanese Patent Laid-Open Publication No. 113472/1991 by way of example. This compensates for the slow start-up of the laser beam. It is a common practice to set the bias current in a range which causes the emission of the laser to sparingly appear as light intensity. Usually, when the drive current exceeds a predetermined threshold current, it brings the laser into an emission state and and increases the beam intensity in proportion thereto. The beam from the laser exposes the photoconductive element. When this occurs while the photoconductive element is out of rotation, the beam causes the element to optically fatigue and changes the charging condition of the element, thereby adversely influencing the resulting image. Preferably, therefore, the bias current should be maintained smaller than the threshold. For this reason, it has been customary to compare a laser output sensed by a photosensor and a target value and control a laser driver to equalize them.

However, to realize rapid response by increasing the process speed and dot density, it is necessary that a bias current close to the threshold current be selected. Then, in an apparatus selecting such a bias current, the bias current causes the laser to emit a beam due to the irregularity in the sensitivity of a photosensor and the response of a control system. As a result, the photoconductive element optically fatigues to degrade image quality. Moreover, when the beam intensity is excessively high, the beam appears in the exposing section as a flare to blur the latent image. Another conventional image forming apparatus is provided with a predetermined bias current greater than the threshold. Even in this type of apparatus, a deviation of the bias current from the predetermined value would aggravate the fatigue of the photoconductive element and change the contrast of an image.

Moreover, with no regard to the purpose of the bias current or whether or not the light source is a semiconductor laser, it is likely that the emission intensity due to the bias current exceeds expected one on account of the irregularity in the sensitivity of the photosensor and the response particular to the control system. Then, the emission will correspondingly accelerate the fatigue of the photoconductive element while aggravating the flare. It follows that even an image forming apparatus having an ordinary LED in place of the laser is apt to suffer from the above-described occurrences. Specifically, assuming a negative-to-positive type image forming apparatus which provides a single dot with multiple levels, the bias current may be constantly fed to the light source so as to obtain an emission intensity associated with the background of an image by feeding a predetermined bias current. The laser may be replaced with an ordinary LED which uses the proportional relation between the voltage fed and the quantity of light in the natural emission state.

SUMMARY OF THE INVENTION

It is therefore an object of the present invention to provide an image forming apparatus which maintains the bias current during image formation at an adequate value by feeding a bias current smaller than a predetermined value to the light source of digital optics even when image formation is not under way.

In accordance with the present invention, an image forming apparatus having digital optics including a light source for forming a latent image on an image carrier, and feeding a bias current smaller than a predetermined value to the light source at least during image formation comprises circuit for determining a drive current for the light source which allows a potential smaller in absolute value than a potential to be deposited on the image carrier by uniformly charging by a predetermined value to deposit on the image carrier, and a bias current setting circuit for setting a bias current to be fed to the light source during image formation by using the drive current.

Also, in accordance with the present invention, an image forming apparatus having digital optics including a light source for forming a latent image on an image carrier, and feeding a bias current smaller than a predetermined value to the light source at least during image formation comprises a potential sensor for sensing a potential deposited on the image carrier by uniform charging, a bias current setting circuit for setting a bias current to be fed to the light source during image formation in response to an output of the potential sensor, a photosensor for sensing a quality of light issuing from the light source, a correcting circuit for correcting the bias current on the basis of an output of the photosensor and a reference value, and a reference value setting circuit for setting, immediately after the bias current setting circuit has set the bias current, the reference value on the basis of a quantity of light sensed by the photosensor when the bias current is fed to the light source.

Further, in accordance with the present invention, an image forming apparatus having digital optics including a light source for forming a latent image on an image carrier, and feeding a bias current smaller than a predetermined value to the light source at least during image formation comprises a charger for uniformly charging the image carrier, a potential sensor for sensing a potential deposited on the image carrier by the charger, a bias current setting circuit for setting a bias current to be fed to the light source during image formation, and a charge control circuit for controlling, before the potential sensor senses the potential, an output of the charger such that a predetermined potential is deposited on the image carrier.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, a brief reference will be made to an image forming apparatus of the type forming a latent image on a photoconductive element or similar image carrier with digital optics including a light source, e.g., a laser or similar LED, shown in FIG. 1A. As shown, the apparatus has a semiconductor laser 1 which emits a laser in association with image data. The laser beam is collimated by a collimator lens 2, steered by a polygonal mirror 3, and then focused onto a photoconductive drum, or image carrier, 5 by an f-theta lens 4. The polygonal mirror 3 is rotated to cause the laser beam to scan the drum 5 in the axial direction or main scanning direction X in a reciprocating motion. At the same time, the drum 5 is rotated to implement subscanning Y. A main charger, not shown, is located upstream of the position where the laser beam scans the drum 5 with respect to the direction of movement of the drum 5. The main charger uniformly charges the surface of the drum 5 beforehand. Other conventional units, e.g., a developing unit, a cleaning unit and a discharger are arranged around the drum 5 to effect an electrophotographic process. There are also shown in the figure a signal processing circuit 6 for transforming an image signal fed from, for example, an image scanner, not shown, to an emission intensity signal, a laser driver 7, and a photosensor 9 for synchronization. The photosensor 9 and control circuit 10 will be described in detail later.

Figure 1A:
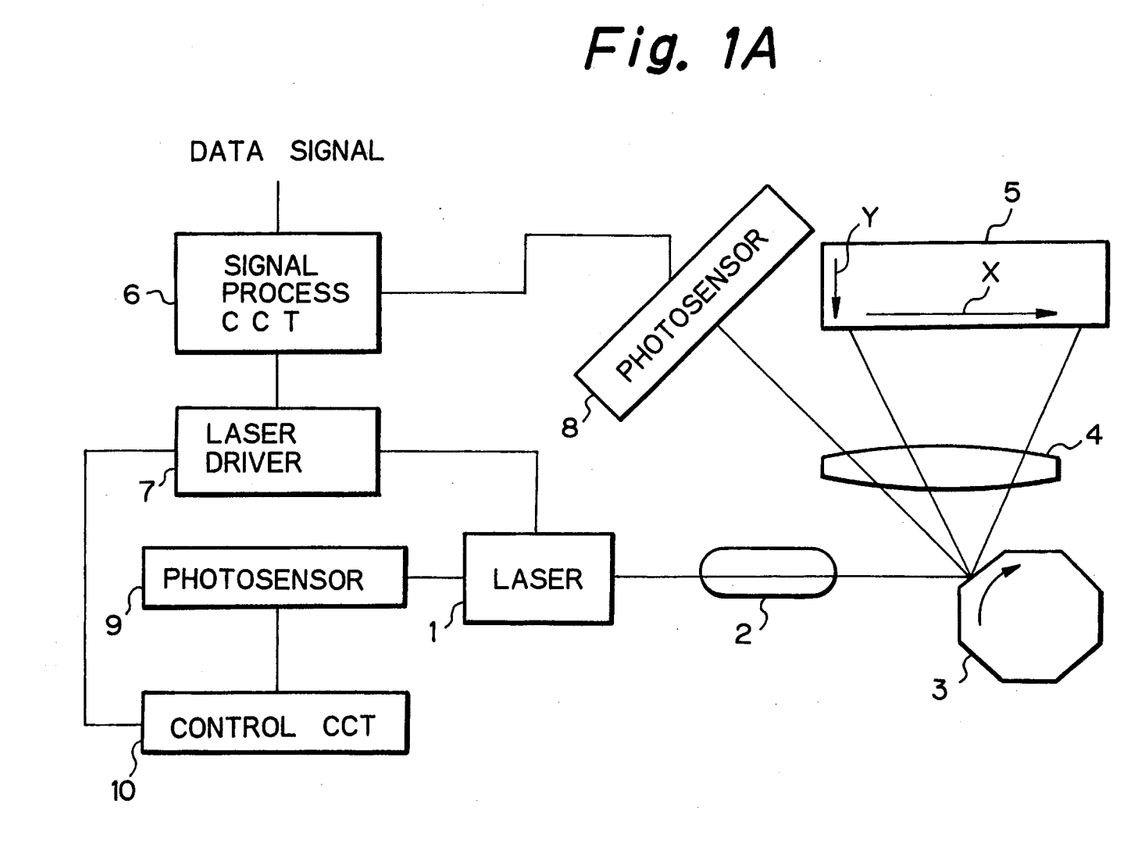
FIG. 1A is a block diagram schematically showing essential part of an image forming apparatus having digital optics.
Figure 1B:
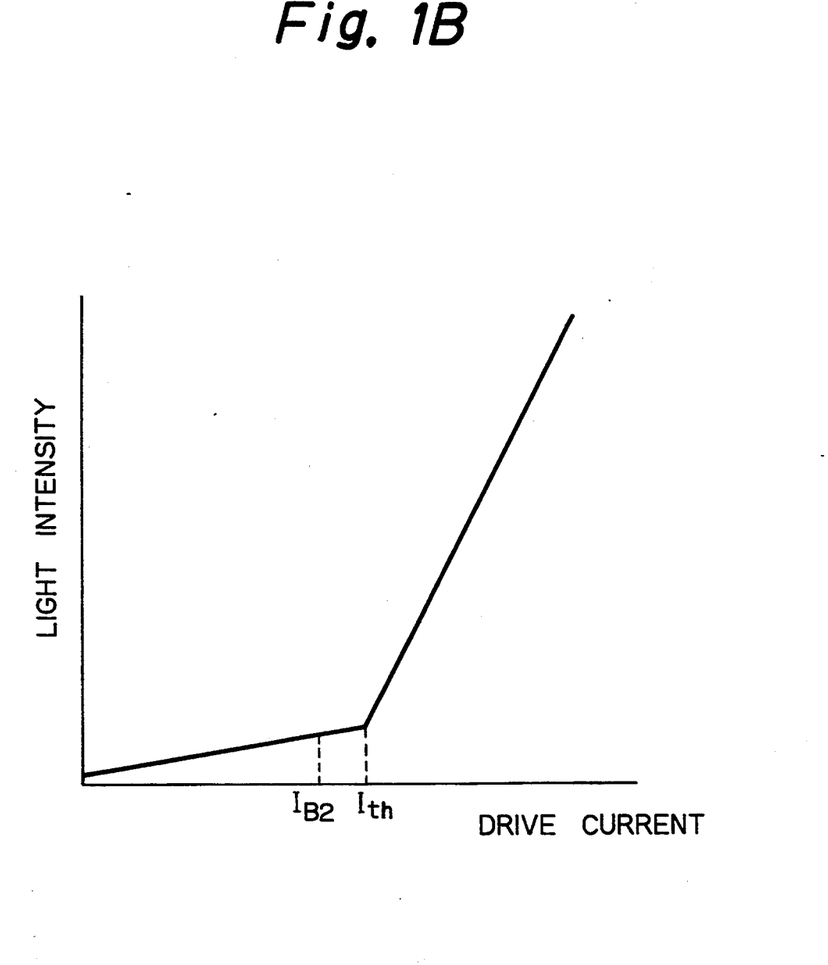
FIG. 1B is a graph representative of a characteristic of a semiconductor laser.

FIG. 1B is a graph representative of a relation between the drive current applied to the laser 1 and the emission intensity. As the graph indicates, to provide the laser beam with particular intensity, a particular drive current has to be fed to the laser 1. However, when the modulation frequency for modulating the laser 1 is increased to increase the process speed of the apparatus, a drive current circuit and the laser 1 itself cannot follow the modulation frequency due to responses particular thereto. To eliminate this problem, it has been proposed to constantly apply a particular bias current to the laser 1, so that the laser drive current may rise to a drive value from the value of the bias current instead of from zero. The compensates for the slow start-up of the laser beam.

As shown in FIG. 1B, when the drive current exceeds a threshold current Ith, it brings the laser i into an emission state and increases the emission intensity in proportion thereto. The beam from the laser 1 exposes the drum 5. When this occurs while the drum 5 is out of rotation, the beam causes the drum 5 to optically fatigue and changes the charging condition of the drum 5, thereby adversely influencing the resulting image. Preferably, therefore, the bias current should be maintained lower than the threshold Ith. For this reason, the control circuit 10 compares a laser output sensed by the photosensor 9 and a target value and controls the laser driver 7 to equalize them.

However, assume that a bias current $I_{B2}$, FIG. 1B, close to the threshold current Ith is selected in order to implement a response rapid enough to follow an increase in process speed and an increase in dot density. Then, the bias current $I_{B2}$ causes the laser 1 to emit a beam due to the irregularity in the sensitivity of the photosensor 9 and the response of the control system. As a result, the drum 5 optically fatigues to degrade image quality. Moreover, when the emission intensity of the laser beam is excessively high, the beam appears in the exposing section as a flare to blur the latent image. Another conventional image forming apparatus is provided with a predetermined bias current higher than the threshold Ith. Even in this type of apparatus, a deviation of the bias current from the predetermined value would accelerate the fatigue of the drum 5 and change the contrast of an image.

Figure 2A:
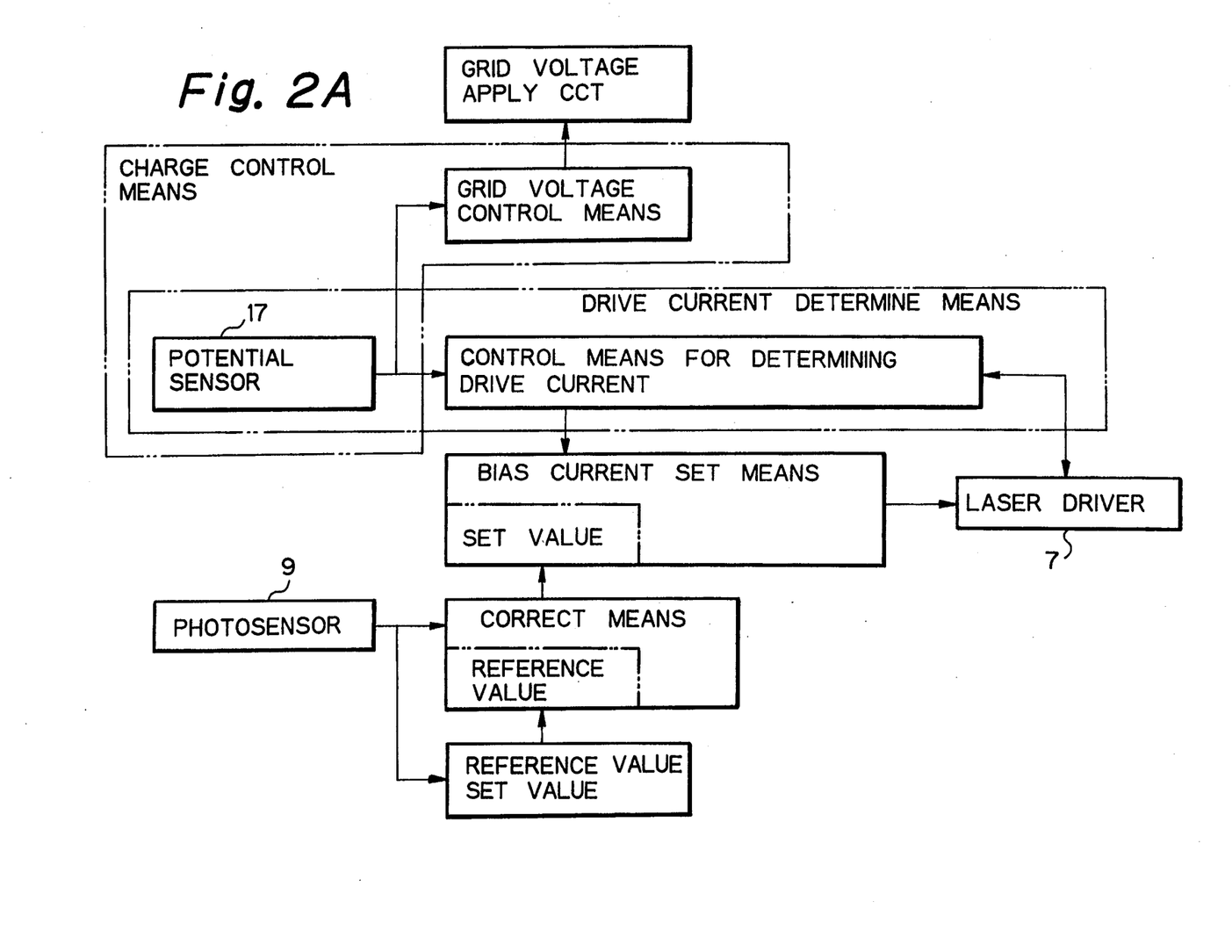
FIGS. 2A and 2B are block diagrams each schematically showing a specific configuration of an image forming apparatus in accordance with the present invention.
Figure 2B:
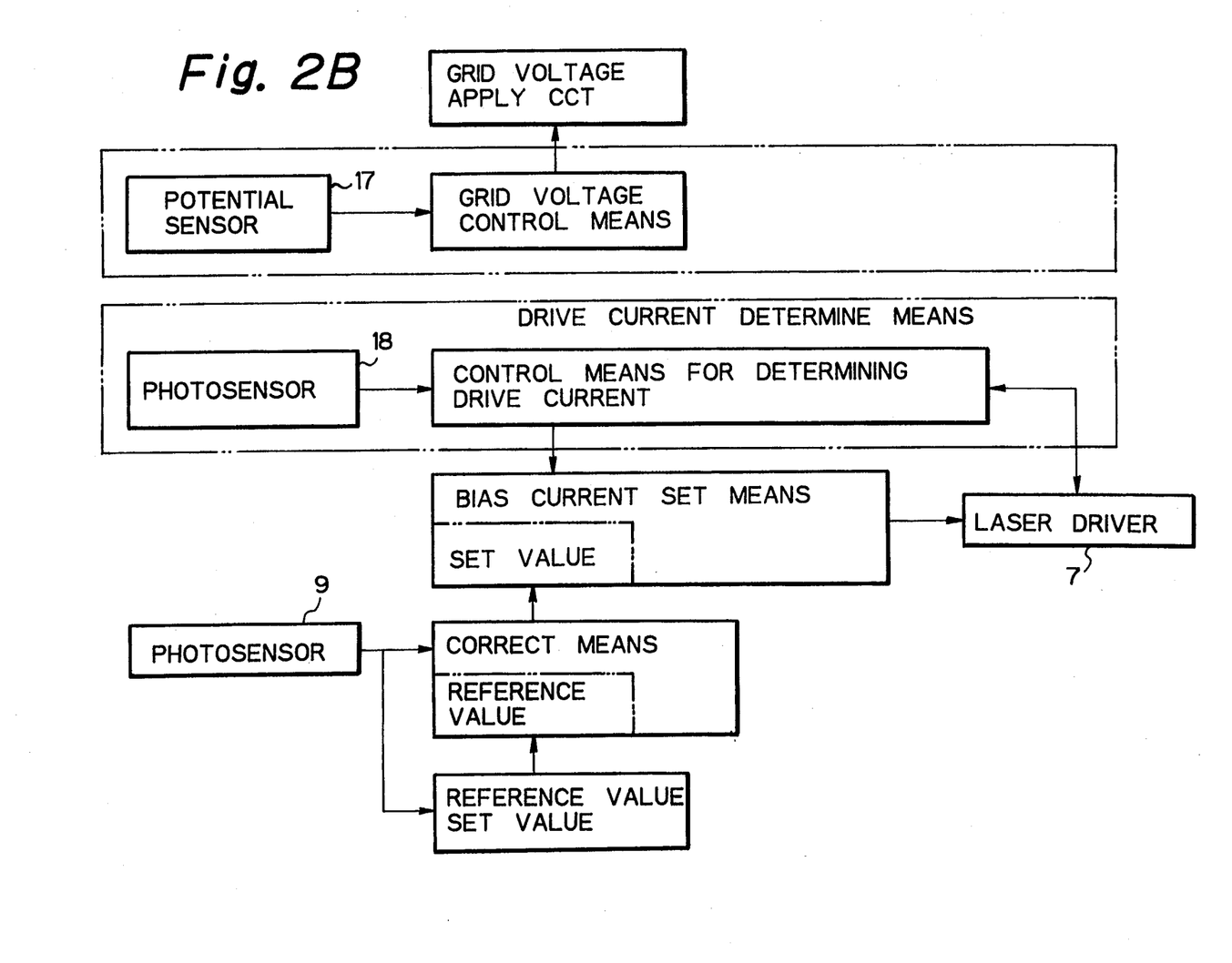
Figure 3A:
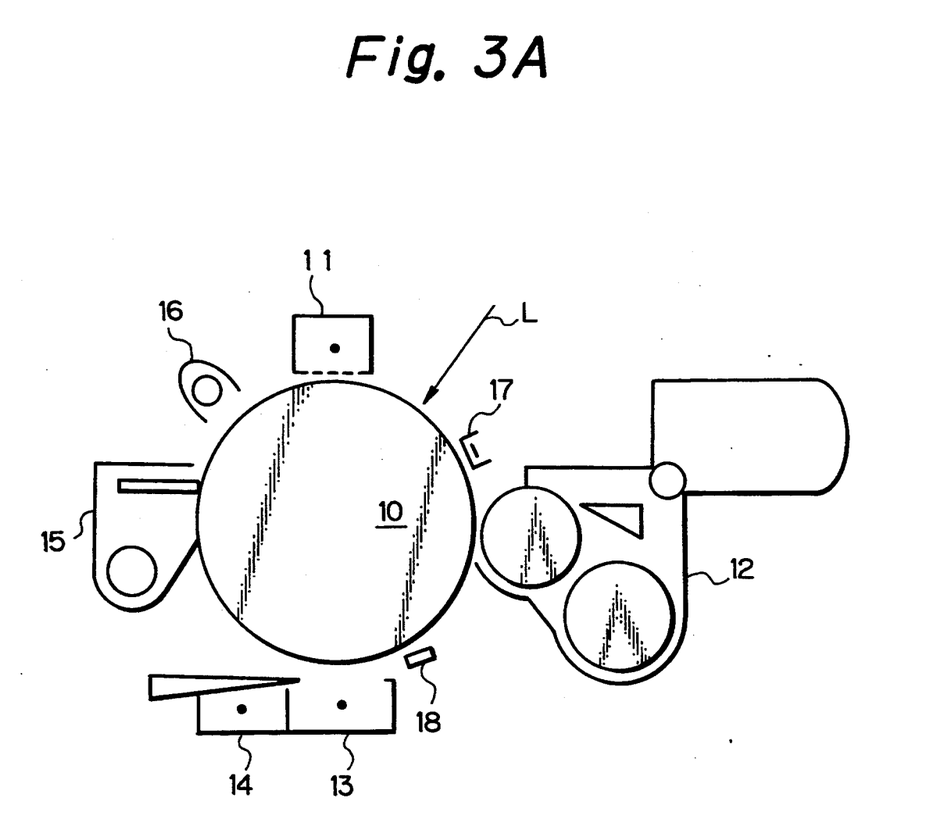
FIG. 3A is a section showing an image forming apparatus embodying the present invention.

Referring to FIGS. 2A and 2B, there are schematically shown two different configurations of an image forming apparatus in accordance with the present invention. FIG. 3A shows the general arrangement of a electrophotographic printer embodying the present invention, particularly a photoconductive drum and units arranged therearound. As shown in FIG. 3A, an image carrier in the form of a photoconductive drum 10 is rotated clockwise. The surface of the drum 10 is uniformly charged by a main charger 11 and then scanned by a laser beam L issuing from digital optics, not shown. As a result, a latent image is electrostatically formed on the drum 10. A developing unit 12 develops the latent image by depositing a toner thereon to produce a corresponding toner image. As a sheet is fed from a sheet feed device, not shown, to the surface of the drum 10, the toner image is transferred to the sheet by an image transfer unit 13. The sheet carrying the toner image thereon is separated from the drum 10 by a sheet separation unit 14 and transported to a fixing unit, not shown. After the toner image has been fixed on the sheet by the fixing unit, the sheet is driven out of the printer as a copy. After the image transfer, the toner remaining on the drum 10 is removed by a cleaning unit 15, and then the charge also remaining on the drum 10 is dissipated by a discharger 16. An electrometer 17 is located to face the drum 10 and interposed between the position where the laser beam L scans the drum 10 and the developing unit 12. The output of the electrometer 17 is used to control a bias current, as will be described later.

Basically, the digital optics included in the embodiment is constructed and operated in the same manner as the conventional optics shown in FIG. 1A. In the illustrative embodiment, to enhance the response of the laser 1, FIG. 1A, a bias current smaller than and close to the threshold Ith, FIG. 1B, is used. The bias current is controlled on the basis of the output of the electrometer 17, as follows.

Figure 3B:
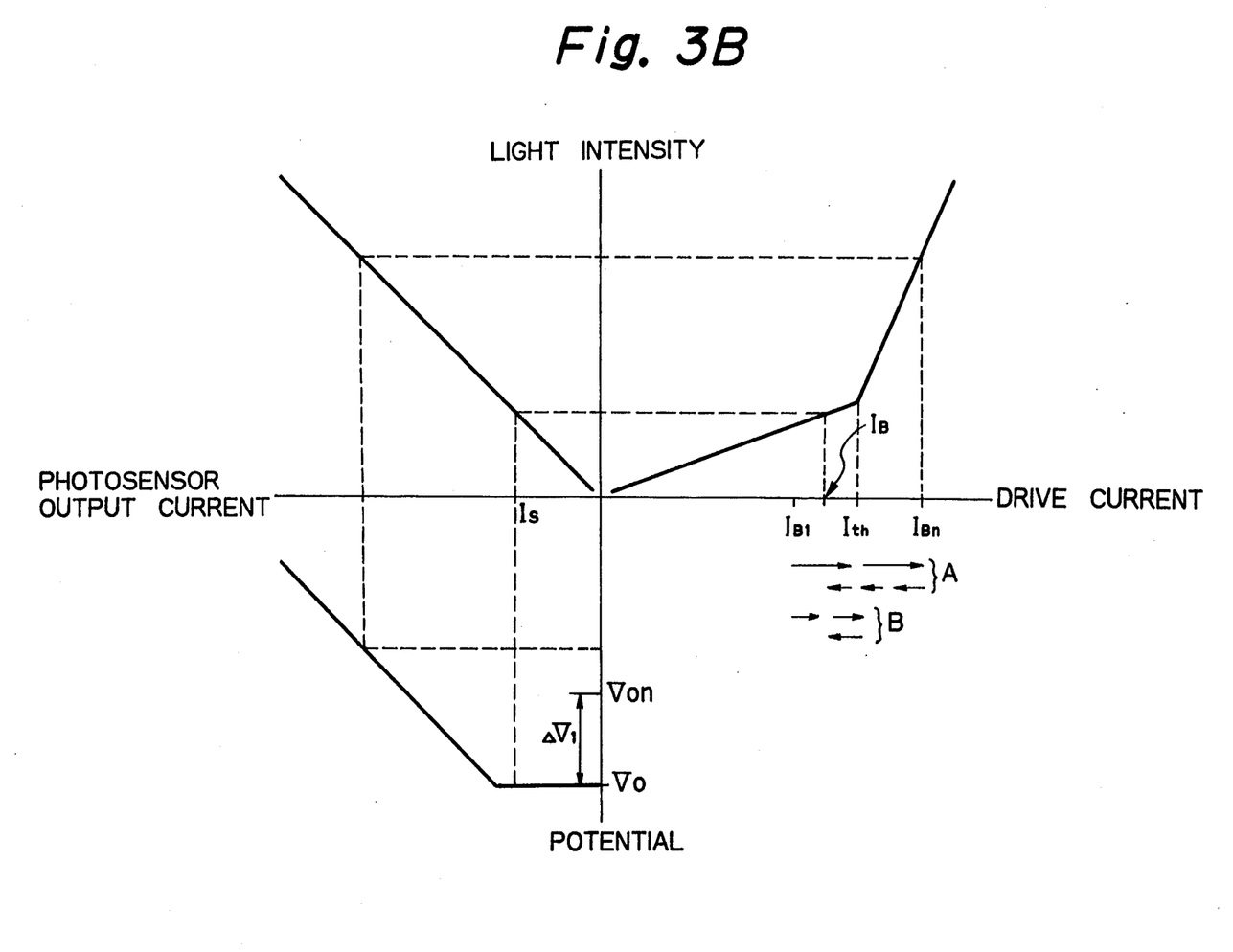
FIG. 3B is a graph indicative of a relation between a drive current for a semiconductor laser particular to the embodiment and the potential of a photoconductive element as well as other factors.
Figure 4:
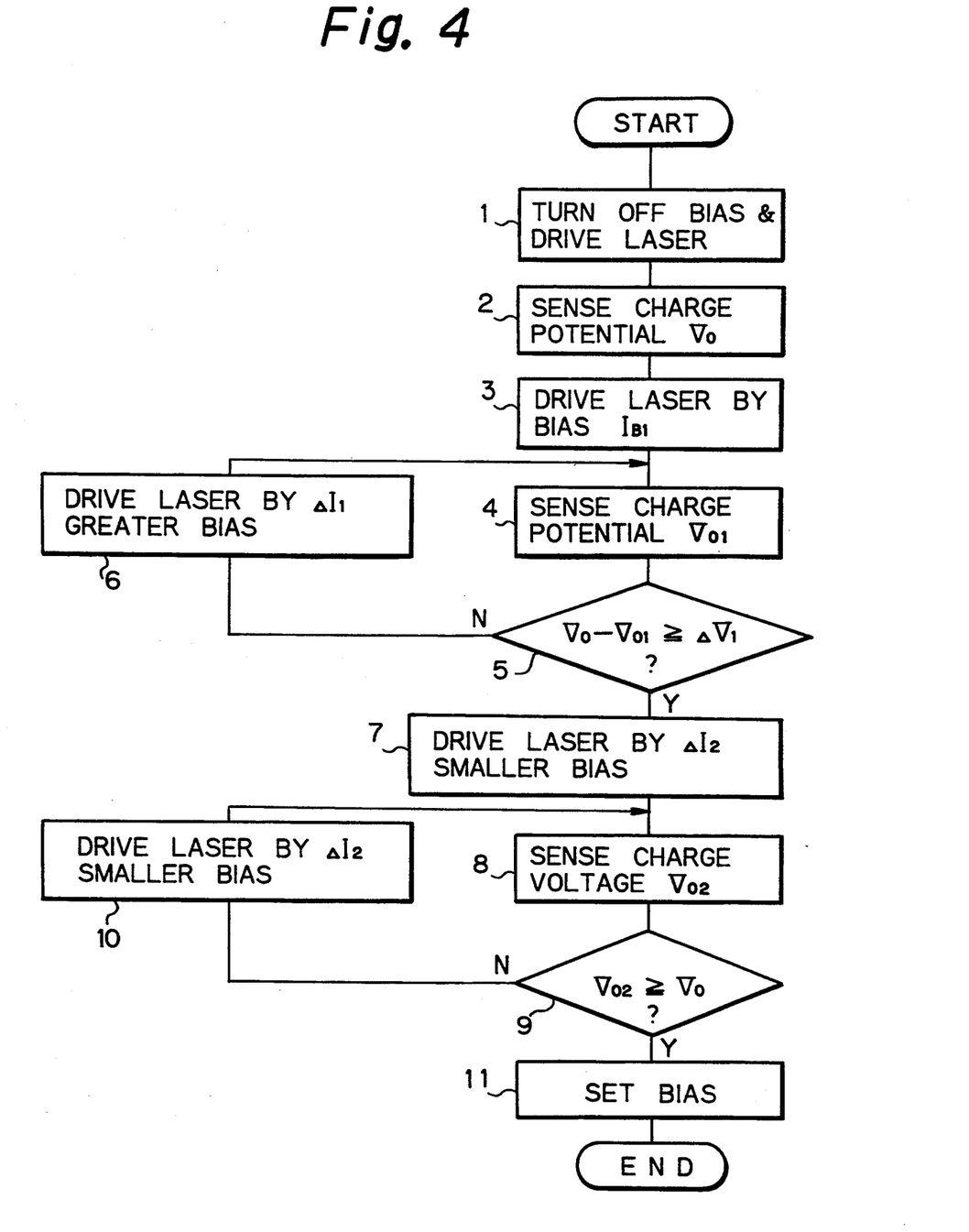
FIG. 4 is a flowchart demonstrating a specific control procedure to be executed by the embodiment.

A reference will be made to FIGS. 3B and 4 for describing the control over the bias current specifically. As shown in FIG. 4, after the main charger 11 has been turned on, the current to the laser 1 is reduced to zero to turn off the laser 1 (step 1). In this condition, the electrometer or potential sensor 17 senses the charge potential $V_0$ deposited in part of the surface of the drum 1 which has passed the writing position (step 2). Subsequently, a predetermined drive current $I_{B1}$ which brings the laser 1 into a natural emission state is fed to the laser 1 (step 3). Then, the potential sensor 17 senses a charge potential $V_{01}$ deposited in part of the surface of the drum 10 which has been scanned by the resulting beam from the laser 1 (step 4).

Whether or not the difference between the sensed charge potentials $(V_0 - V_{01})$ is greater than or equal to a predetermined value $\Delta V_1$ is determined (step 5). The value $\Delta V_1$ is representative of a potential difference between an image portion and a non-image portion which provides a latent image with an ideal contrast. For example, assume that a laser beam of predetermined intensity scans only part of the surface of a photoconductive element where a toner should be deposited so as to lower the potential of such part than the other part, thereby electrostatically forming a latent image. Then, the value $\Delta V_1$ is a potential difference between the part not scanned by the laser of predetermined intensity and the part scanned by the laser. If the above-stated condition is not satisfied (N, step 5), the drive current $I_{B1}$ is replaced with a drive current greater than $I_{B1}$ by a predetermined value $\Delta I_1$. The resulting current $(I_{B1} + \Delta I_1)$ is fed to the laser 1 to drive it (step 6). The potential sensor 17 again senses a charge potential $V_{01}$ of the surface of the drum 10 scanned by the beam from the laser 1 (step 4). Whether this potential $V_{01}$ and the previously sensed potential $V_0$ satisfy the above-stated condition is determined (step 5). If the result of this decision is also negative, the drive current is again increased by $\Delta I_1$ to repeat the above procedure. Such an iterative procedure is repeated until the above-stated condition has been satisfied. During this procedure, the drive current is sequentially changed to greater one, as indicated by upper arrows A in FIG. 3B (representative of two consecutive increases). As a result, a drive current ($I_{Bn}$, FIG. 3B) higher than the threshold Ith and surely causing the laser 1 to emit light is set up.

Assume that the condition of interest is satisfied by the above-described stepwise increase of the drive current or without it. i.e., at the drive current $I_{B1}$ (Y, step 5). Then, the drive current finally set is up (labeled $I_{Bn}$ hereinafter) is reduced by a predetermined value $\Delta I_2$ to drive the laser 1 by the resulting current $(I_{Bn} - \Delta I_2)$ (step 7). The value $\Delta I_2$ is selected to be smaller than the value $\Delta I_1$. As the laser 1 scans the surface of the drum 10 in response to the current $(I_{Bn} - \Delta I_2)$, the potential sensor 17 senses the resulting charge potential $V_{02}$ of the drum 10 (step 8). Then, whether or not the sensed potential $V_{02}$ is higher than or equal to the previously sensed potential $V_0$ is determined (the former may be higher than or equal to the latter due to an error or irregularity particular to the sensing system) (step 9).

If the answer of the step 9 is negative, N, the drive current to the laser 1 is again reduced by $\Delta I_2$, i.e., to $I_{Bn} - 2\Delta I_2$ to drive the laser 1 (step 10). Then, the potential sensor 17 senses a charge potential $V_{\theta 2}$ of the part of the drum 10 scanned by the resulting beam from the laser 1 (step 8), and whether or not this potential $V_{02}$ is higher than or equal to the previously sensed potential $V_0$ is determined again (step 9). Such a procedure is repeated until the potential $V_{02}$ becomes higher than or equal to the potential $V_0$. During this procedure, the drive current is sequentially lowered, as indicated by lower arrows A in FIG. 3B (representative of three consecutive decreases). As a result, a drive current ($I_B$, FIG. 3B) lower than the threshold Ith and capable of surely preventing the laser 1 from emitting light is set up. Preferably, the value $\Delta I_2$ should be as small as possible to make the final drive current $I_B$ closer to the threshold Ith within the range lower than the threshold Ith.

When the above-stated relation is satisfied as a result of the stepwise decrease of the drive current (Y, step 9), the drive current finally set up is used as a bias current for image formation. (step 11).

To summarize the embodiment, the drive current to be fed to the laser 1 is once increased beyond the threshold Ith. Then, while the drive current is sequentially lowered stepwise, the resulting potentials on the drum 10 are sensed by the potential sensor 17 and each is compared with the potential $V_0$ sensed when the laser 1 was turned off. A drive current which caused the potential to exceed $V_0$ for the first time is set as a bias current for image formation. Therefore, it is possible to enhance the response of the laser 1 by selecting a bias current lower than and close to the threshold Ith.

Modifications of the above-described bias current setting procedure will be described hereinafter.

In the above embodiment, the drive current to be fed to the laser 1 is once increased to above the threshold Ith and then sequentially reduced toward a target current. Alternatively, the drive current may be sequentially changed in the range higher than or lower than the threshold Ith and toward the threshold Ith, as will be described with reference to FIG. 5.

Figure 5:
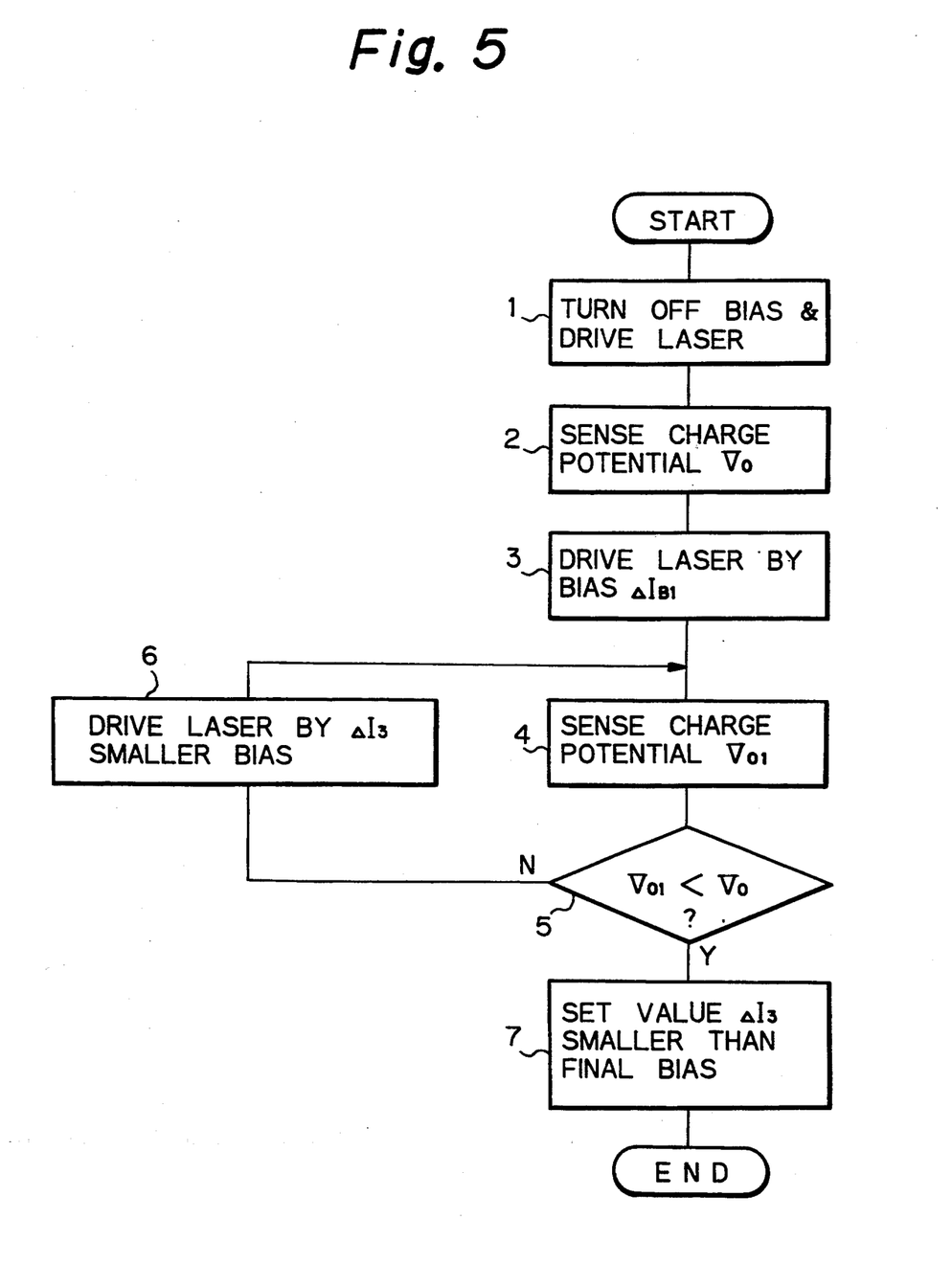
FIGS. 5 and 6 are flowcharts each showing a particular modification of the embodiment.

In FIG. 5, while the main charger 11 is driven, the current to the laser 1 is reduced to zero to turn off the laser 1 (step 1). In this condition, the potential sensor 17 senses a charge potential deposited on part of the surface of the drum 10 having passed the writing position (step 2). Then a predetermined drive current $I_{B1}$ which brings the laser 1 into a natural emission state is applied to the laser 1 to drive it (step 3). The potential sensor 17 senses the resulting potential $V_{01}$ deposited on the scanned surface of the drum 10 (step 4).

Subsequently, whether or not the sensed potential $V_{01}$ is lower than the previously sensed potential $V_0$ is determined. If the potential $V_{01}$ is not lower than the potential $V_0$ (N, step 5), the drive current to the laser 1 is increased by a predetermined value $\Delta I_3$ so as to drive the laser 1 by a current $(I_{B1}+\Delta I_3)$ (step 6). The potential sensor 17 again senses the resulting charge potential $V_{01}$ deposited on the drum 10 by the laser 1 (step 4). Whether or not the potential $V_{01}$ sensed this time is lower than the previously sensed potential $V_0$ is determined (step 5). If the answer of the step 5 is also negative, the drive current is again increased by $\Delta I_3$, and the resulting potential $V_{01}$ is sensed. Such a procedure is repeated until the potential $V_{01}$ becomes lower than the potential $V_0$. During this procedure, the drive current is sequentially increased stepwise, as indicated by upper arrows B in FIG. 3B (representative of two consecutive increases). As a result, a drive current higher than the threshold Ith and capable of surely causing the laser 1 to emit light is set up.

Assume that the condition of interest is satisfied by the above-described stepwise increase of the drive current or without it, i.e., at the drive current $I_{B1}$ (Y, step 5). Then, a drive current smaller than the final drive current (labeled $I_{Bn}$ hereinafter) by $\Delta I_3$ is selected as a bias current for image formation.

Assume that any one of the control procedures described above is applied to the digital optics of FIG. 1A having the photosensor 8 for a feedback purpose. Then, an arrangement may be made such that the laser 1 is driven by a bias current set by the control procedure, and the intensity of the resulting laser beam is sensed by the photosensor 8. In this case, the output of the photosensor 8 representative of the intensity will be memorized and used as a target value until the bias current control is effected again. This kind of scheme will implement more stable bias current control.

In any one of the specific control procedures described above, control may be executed such that the charge potential $V_0$ to be sensed when the laser 1 is turned off coincides with a target potential. For example, the grid potential of the main charger 11 may be controlled on the basis of the result of comparison of the voltage sensed by the potential sensor 17 and a target potential. This is also successful in making the bias current control more stable.

The above control procedures have used the charge potential $V_0$ sensed when the laser 1 is turned off as a potential to compare. Alternatively, use may be made of a potential on part of the surface of the drum 1 having passed the writing position when a small drive current is fed to the laser 1, so long as it is allowable in relation to, for example, the fatigue of the drum 10. In this case, the drive current should preferably be smaller than the threshold and capable of maintaining the laser in the natural emission state (LED emission state). For example, considering the adverse influence (flare) on the fatigue of the drum 10 and image quality, the drive current should preferably confined in a range which provides the drum 10 with a surface potential which is more than 90%, desirably more than 95%, of the surface potential to deposit when the laser 1 is turned off. Then, the bias current to be set by any one of the control procedure will also be prevented from aggravating the fatigue of the drum 10 or lowering image quality.

In the embodiment and modifications thereof, the potential sensor 17 is used to directly sense a potential to compare and a charge potential deposited in the sampling area of the drum 10 by a beam from the laser 1 being driven by a bias current. Alternatively, a photosensor 18, FIG. 3A, responsive to a reflection from the surface of the drum 10 may be used to sense such potentials indirectly after the potential portions have been developed by the developing unit 12. This is derived from the fact that the surface potential of the drum 10 and the amount of toner deposition have a known particular relation, and the amount of toner deposition and the output of the photosensor 18 also have a known particular relation. In this case, in an image forming apparatus of the type using a developing unit operable with a two-component developer and controlling toner supplement by determining an amount of toner deposited on a reference toner image in terms of the output of a photosensor, the photosensor can be used to effect the bias current setting procedure as well. In addition, the photosensor senses the toner actually deposited on the surface portion of the drum 10 which is scanned by the laser 1 being driven by a bias current. Hence, an adequate bias current which does not contaminate the background when fed to the laser 1 can be set up with accuracy.

When the amount of toner deposition is sensed to determine an accurate bias potential as stated above, it is preferable to select a condition which allows a latent image to be developed more easily than during actual image formation. For example, a relatively low charge potential or a relatively high bias for development is selected to make the developing potential, i.e., the potential difference between the potential portion to compare and sampling area of the drum 10 and a developing roller or similar electrode and developer transport member included in the developing unit 12 greater than during actual image formation. Then, an adequate bias current will be selected with consideration given to such a difference in condition.

Assume that the primary object is to set up a bias current which does not contaminate the background of an image. Then, a control procedure is available which omits the step of sensing a potential on part of the drum 10 having been uniformly charged but not scanned by the laser 1 being driven by a bias current or an amount of toner deposition. Specifically, this control procedure sets a bias current by using only a potential on the surface portion of the drum 10 having been uniformly charged and scanned by the laser 1 or an amount of toner deposition. A specific control procedure of this kind will be described with reference to FIG. 6.

Figure 6:
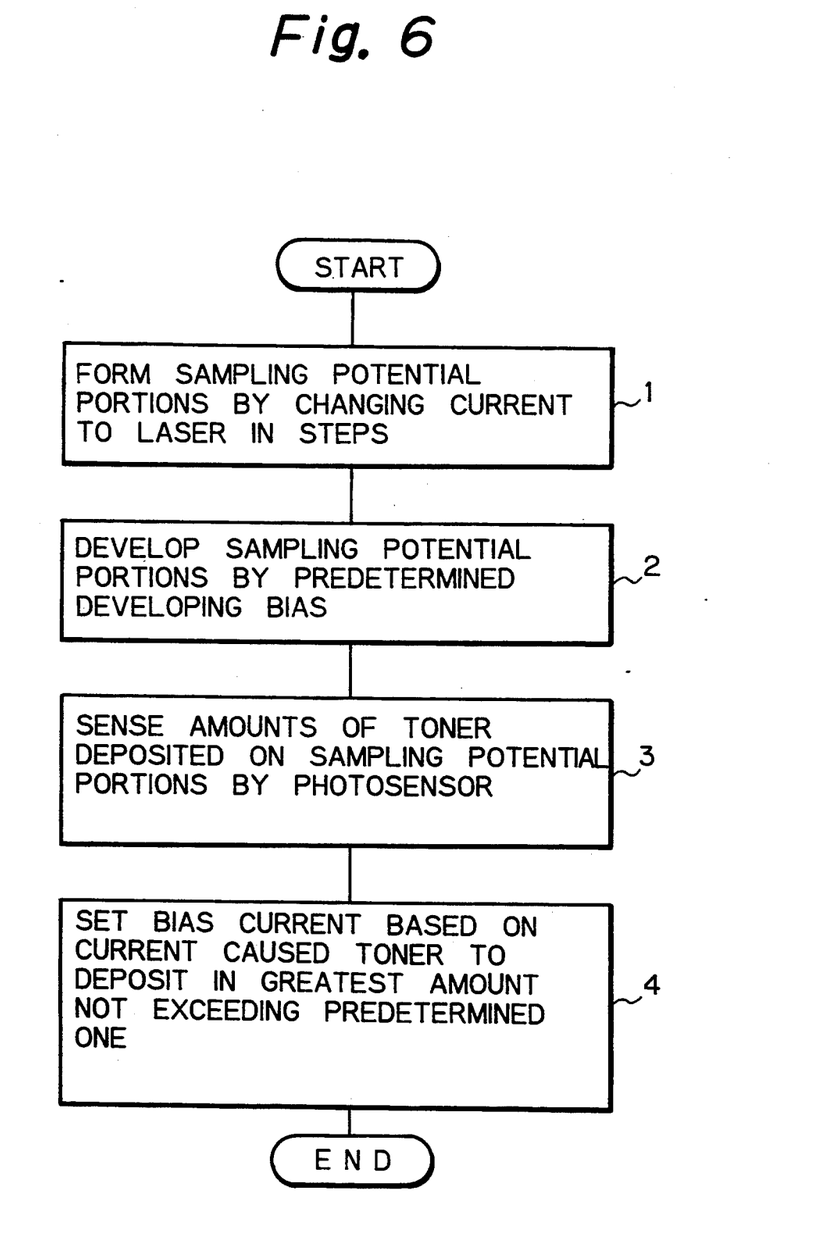

In FIG. 6, while the main charger 11 is driven to deposit a predetermined charge on the drum 10, a current to the laser 1 is sequentially changed stepwise to form a plurality of sampling potential portions on the drum 10 which are continuous in the moving direction of the drum 10 (step 1). The sampling potential portions are sequentially developed by the developing unit 12 to which a predetermined bias for development is applied (step 2). At this instant, the predetermined charge potential and the predetermined bias for development are so selected as to set up a greater developing potential than during usual image formation, as stated earlier. The photosensor 18 senses the amounts of toner deposited in the consecutive sampling potential portions by the developing unit 12 (step 3). Then, a bias current is set up on the basis of the current which caused a toner to deposit in the greatest amount not exceeding a predetermined value (step 4). Here, the words "predetermined value" refer to a value corresponding to a developing potential which, assuming development effected by the uniform charge and bias for usual image formation, causes a toner to deposit in the greatest amount allowable from the background contamination standpoint.

The above-described control allows the greatest bias current to be set up while confining the background contamination in the allowable range. Since a plurality of consecutive potential portions are formed, the procedure for setting up a bias current can be rapidly executed. If desired, the potentials of the sampling potential portions may be directly sensed by the potential sensor 17 in place of the amounts of toner deposition. This is also successful in setting up a bias current rapidly.

While the embodiment has been shown and described in relation to an image forming apparatus using a laser as digital optics, the laser may, of course, be replaced with an LED or similar light emitting device.

In summary, it will be seen that the present invention provides an image forming apparatus capable of maintaining a bias current for image formation at an adequate value regarding, among others, background contamination. In addition, the apparatus of the invention sets up such a bias current rapidly.

Various modifications will become possible for those skilled in the art after receiving the teachings of the present disclosure without departing from the scope thereof.

What is claimed is:

1. An image forming apparatus having digital optics including a light source for forming a latent image on an image carrier, and feeding a bias current smaller than a predetermined value to said light source at least during image formation, said apparatus comprising:
    means for determining a drive current for the light source which allows a potential smaller in absolute value than a potential to be deposited on the image carrier by uniformly charging by a predetermined value to deposit on said image carrier; and
    bias current setting means for setting a bias current to be ted to the light source during image formation by using said drive current.

2. An image forming apparatus having digital optics including a light source for forming a latent image on an image carrier, and feeding a bias current smaller than a predetermined value to said light source at least during image formation, said apparatus comprising:
    potential sensing means for sensing a potential deposited on the image carrier by uniform charging;
    bias current setting means for setting a bias current to be fed to the light source during image formation in response to an output of said potential sensing means;
    photosensing means for sensing a quality of light issuing from the light source;
    correcting means for correcting the bias current on the basis of an output of said photosensing means and a reference value; and
    reference value setting means for setting, immediately after said bias current setting means has set the bias current, the reference value on the basis of a quantity of light sensed by said photosensing means when said bias current is fed to the light source.

3. An apparatus as claimed in claim 2, further comprising toner deposition sensing means in place of said potential sensing means for sensing an amount of a toner deposited at least in a portion of the image carrier having been uniformly charged and developed.

4. An apparatus as claimed in claim 2, further comprising toner deposition sensing means in place of said potential sensing means for sensing an amount of a toner deposited in a particular portion of the image carrier having been charged to a predetermined potential, passed through a writing position of the digital optics whose light source is applied the bias current, and then developed.

5. An apparatus as claimed in claim 4, wherein to form the particular portion of the image carrier, the bias current for the light source is changed in a plurality of steps.

6. An image forming apparatus having digital optics including a light source for forming a latent image on an image carrier, and feeding a bias current smaller than a predetermined value to said light source at least during image formation, said apparatus comprising:
    charging means for uniformly charging the image carrier:
    potential sensing means for sensing a potential deposited on the image carrier by said charging means;
    bias current setting means for setting a bias current to be fed to the light source during image formation; and
    charge control means for controlling, before said potential sensing means senses the potential, an output of said charging means such that a predetermined potential is deposited on the image carrier.

7. An apparatus as claimed in claim 6, further comprising toner deposition sensing means in place of said potential sensing means for sensing an amount of a toner deposited at least in a portion of the image carrier having been uniformly charged and developed.

8. An apparatus as claimed in claim 6, further comprising toner deposition sensing means in place of said potential sensing means for sensing an amount of a toner deposited in a particular portion of the image carrier having been charged to a predetermined potential, passed through a writing position of the digital optics whose light source is applied with the bias current, and then developed.

9. An apparatus as claimed in claim 6, wherein to form the particular portion of the image carrier, the bias current for the light source is changed in a plurality of steps.

* * * * *